United States Patent [19]

Colmer

[11] 4,057,365

[45] Nov. 8, 1977

[54] SUBMERSIBLE THRUST LIMIT SWITCH

[76] Inventor: Marvin L. Colmer, 530 S. Berkshire, Crosbyton, Tex. 79322

[21] Appl. No.: 676,368

[22] Filed: Apr. 12, 1976

[51] Int. Cl.² .............................................. F04B 49/06
[52] U.S. Cl. ..................................... 417/44; 308/1 A; 417/13; 417/63
[58] Field of Search ...................... 417/9, 13, 410, 424, 417/44, 63; 415/9, 118; 308/1 A; 116/115, 124 A, DIG. 21; 200/61.4, 61.39, 61.41, 61.42

[56] References Cited

U.S. PATENT DOCUMENTS

| | | | |
|---|---|---|---|
| 2,209,466 | 7/1940 | Miller | 415/118 X |
| 2,577,559 | 12/1951 | Armstrong et al. | 417/13 |
| 3,220,244 | 11/1965 | Donnelly | 415/118 X |
| 3,853,087 | 12/1974 | Aldag | 308/1 A |

Primary Examiner—William L. Freeh
Assistant Examiner—Edward Look
Attorney, Agent, or Firm—Wendell Coffee

[57] ABSTRACT

A submersible thrust limit switch is mounted between the motor and the pump, thus detecting any predetermined drop in the shaft. Means is provided to shut down the motor and signal upon the opening of the contacts in the switch.

10 Claims, 5 Drawing Figures

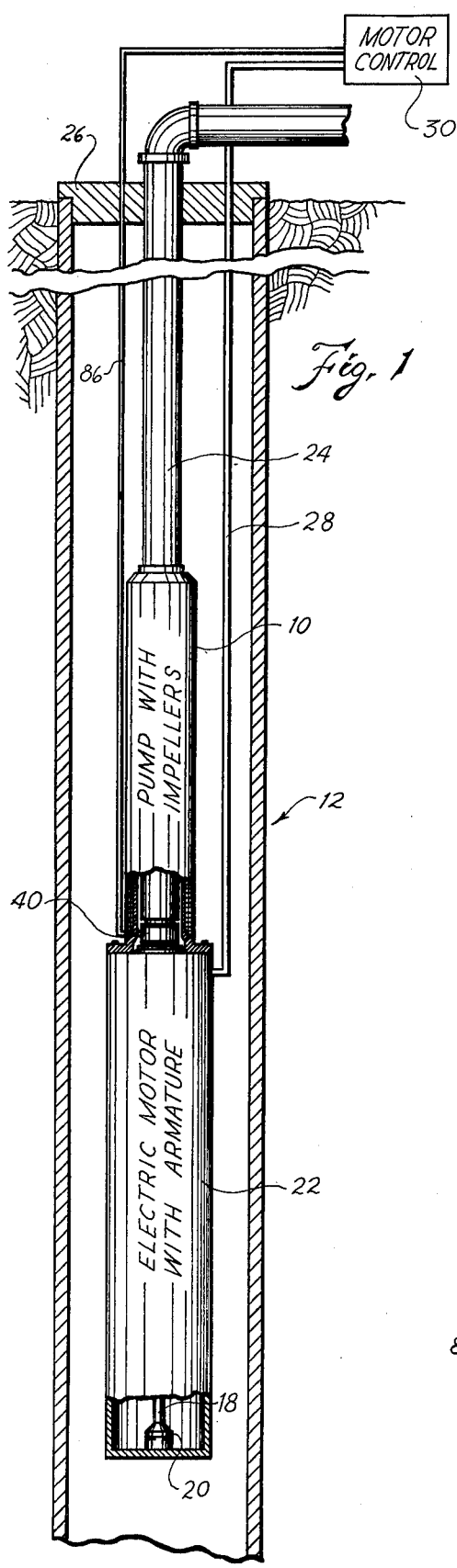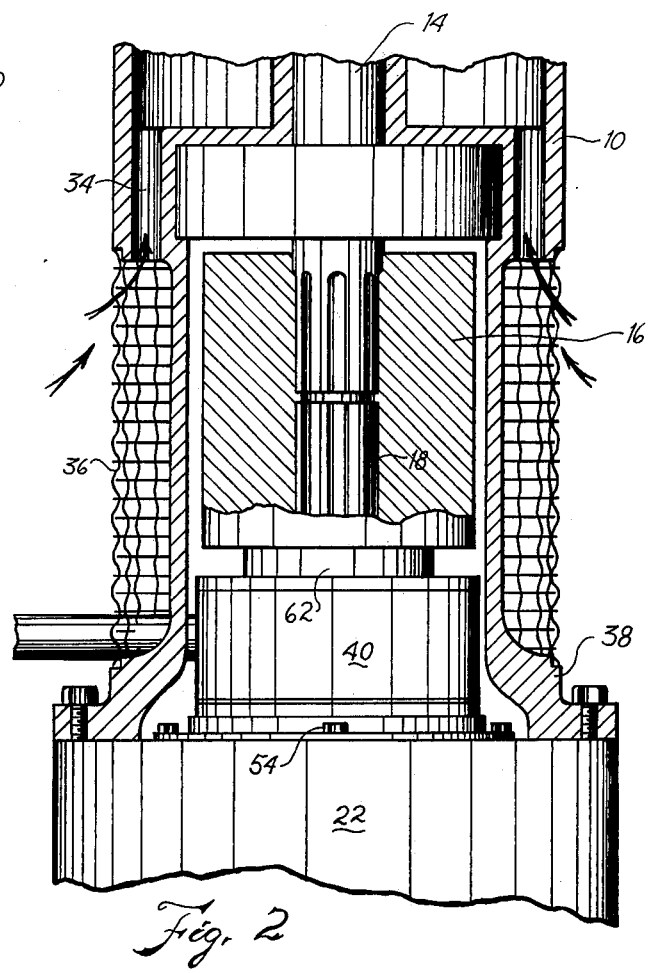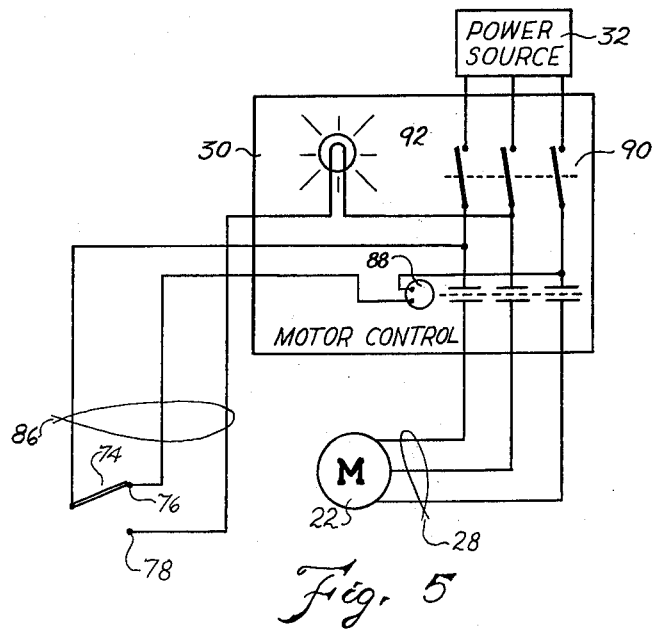

1

SUBMERSIBLE THRUST LIMIT SWITCH

CROSS-REFERENCE TO RELATED APPLICATIONS

None. However, applicant filed Disclosure Document No. 042362 on July 14, 1975, which document concerns this application; therefore, by separate letter, it is respectfully requested that the document be retained.

BACKGROUND OF THE INVENTION

1. Filed of the Invention

This invention relates to the field of submersible motor and pump protection.

2. Description of the Prior Art

In recent years, many devices have been utilized to provide a signal upon a bearing failure, and in most devices the signal does not occur until the bearing has completely failed. Some bearing failure indicators are adaptable to pumps having vertical drive shafts. Some bearing failure indicators are used with a motor having a horizontal shaft and are concerned with movement in a radial direction of the shaft as opposed to axial movement of a shaft. Some bearing failure indicators are concerned with an alarm when the output flow of the pump fails. However, there are many special problems involved with submersible pumps and motors and therefore limit switches used for other installations are not applicable to the submersible motor and pump.

Applicant was aware of the following U.S. Patents at the time of filing this application:

U.S. Pat. No. 2,577,559 — Armstrong
U.S. Pat. No. 3,050,003 — Edwards
U.S. Pat. No. 3,373,300 — Sullivan
U.S. Pat. No. 3,508,241 — Potter
U.S. Pat. No. 3,853,087 — Aldag

SUMMARY OF THE INVENTION

1. New and Different Function

My invention provides a means for preventing major mechanical failure due to a thrust bearing failure in any degree. Heretofore, the submersible protection did not provide protection for both the pump and motor simultaneously. In the present invention, should a submersible motor thrust bearing fail in any manner, the submersible motor and pump would be shut down before any major mechanical damage.

2. Objects of this Invention

An object of this invention is not to prevent damage to a submersible thrust bearing, but is to prevent a major mechanical failure to the submersible motor and pump in the event of a thrust bearing failure.

Other objects are to achieve the above with a device that is lightweight, compact, durable, simple, safe, versatile, efficient, reliable, and yet inexpensive and easy to manufacture, operate and maintain.

Further objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a schematic representation of a submersible pump and motor in a well.

FIG. 2 is an axial view partially in section showing a limit switch according to this invention located between the top of the motor and the bottom of the pump.

FIG. 5 is a schematic representation of a portion of the electrical controls used with this invention.

DESCRIPTION OF THE PREFERRED EMBODIMENT

Figure 3:
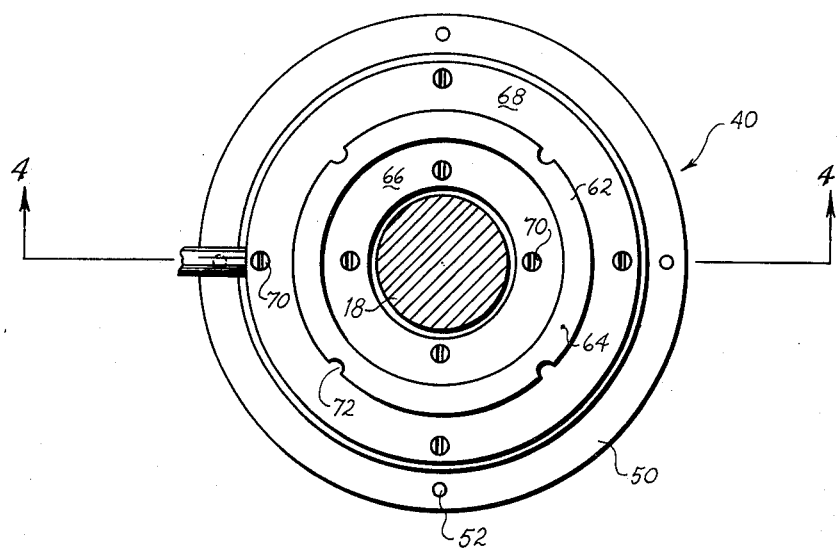
FIG. 3 is a sectional view of the limit switch taken substantially on line 3—3 of FIG. 4, also showing the shaft.

Referring particularly to FIG. 1 of the drawing, there may be seen submersible pump 10 submerged within well 12. The water is not shown in the drawing for simplicity of illustration, it will be understood that there would be water there. It will also be understood by those skilled in the art that the pump will have a series of impellers operated by shaft 14 attached by coupler 16 to motor shaft 18.

The motor shaft 18 is supported by thrust bearing 20. It will be understood by those skilled in the art that electric motor 22 has an armature attached to the shaft 18. The pump and motor are suspended in the well 12 by discharge line or education tube 24. The discharge line 24 is supported at the top of the ground by well cover or plate 26.

Electric power cable 28 extends from motor control 30 to the electric motor 22. The motor control is means for connecting the electric motor 22 to power source 32 which is a source of electrical energy. There are seals around all other motor openings to prevent fluid from entering the motor so the motor may be operated submersed in water.

Seen in FIG. 2, there are water intake openings 34 at or near the bottom of the pump 10. The area between the pump and motor is covered by screen 36. The pump has depending housing 38 by which the motor and pump are structurally securely attached together. The housing in the design of many pumps is water tight so there is little or no water at the top of the motor 22. However, because the seal at the bottom of the shaft 14 may be worn or ineffective, often there is water within the housing 38. It will be understood that if the bearing 20 fails, not only will the electric motor shaft 18 drop downward, causing wear and damage to the armature within the electric motor, but the pump shaft 14 drops down, causing wear and damage to the impellers attached thereto. If the unit continues to run after failure of the thrust bearing 20, both the pump and the motor will be severely damaged if not completely destroyed.

Those skilled in the art will understand the description to this point describes conventional equipment which has been commercially available on the market.

To this equipment, I have added limit switch 40 so that as soon as the thrust bearing 20 begins to fail and the motor shaft 18 and the pump shaft 14 begin to drop, the unit is immediately shut down, the warning signal illuminated, so that minor repairs may be made before major damage occurs.

Figure 4:
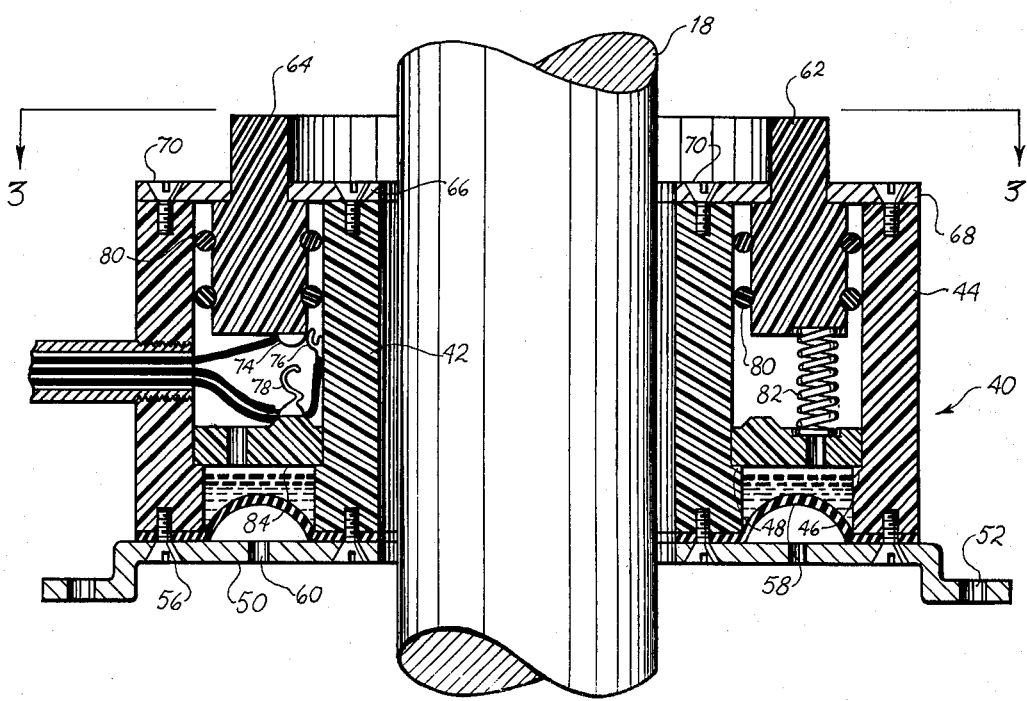
FIG. 4 is an axial sectional view of a limit switch taken substantially on line 4—4 of FIG. 3, also showing the shaft.

Referring now more particularly to FIGS. 3 and 4, there may be seen that the switch housing is constructed primarily of inner band or ring 42 and outer band or ring 44. The outer band 44 is cylindrical on the outside. On the inside there is shoulder 46 near the bottom thereof. Otherwise, the inner surface of the ring 44 is also cylindrical. The surface of the inside ring 42, which is next to the motor shaft 18, is cylindrical. Since this outside of the switch, it is considered the outside surface. The inside surface, which is inside the switch, has shoulder 48 at the same level as the shoulder 46 on the outer ring 44. Otherwise, the inside surface of the inner ring 42 is cylindrical. The inner and outer rings 44 and 42 are conveniently attached together by annular base plate 50. The base plate 50 has a plurality of bolt holes 52 therein by which a switch is readily attached to the top of the motor by screws 54 as seen in FIG. 2. The inner ring 42 and outer ring 44 are attached as by studs 56 to the base plate.

Annular bellows or diaphragm 58 between the base plate and the inside of the switch operates to equalize pressure. I.e., the bottom of the diaphragm is exposed through vents 60 to the fluid surrounding the switch. Because of its flexibility if the fluid outside of the switch is greater within the switch, the diaphragm will move upwards so as to equalize the pressure and lessen the possibility of leakage of water into the switch.

As may be seen, there is ample clearance between the outside of the inner ring 42 and the shaft 18.

Annular switch operator or switch ring 62 is positioned between the inner and outer rings 42 and 44. It has an upper surface 64 which is adapted to be contacted by the bottom surface of the coupler 16. The switch ring 62 is held in place by inner top ring 66 and outer top ring 68. Each of the top rings 66 and 68 are held to their respective rings 42 and 44 by suitable studs 70. The switch ring 62 has suitable shoulders beneath the top rings 66 and 68 to retain it in place. Also, there are grooves 72 within the surface of the switch ring 62 which match with corresponding nibs upon the outer top ring 68 to prevent the switch ring from rotating. This prevention of rotating causes switch contact 74 to maintain alignment with switch contacts 76 and 78.

A pair of O-rings 80 are mounted between the switch ring 62 and the rings 42 and 44 to maintain the inside of the switch water free as illustrated. A plurality of compression springs 82 (one of which shows in the drawing) bias the switch ring 62 upward in firm contact to the bottom of the coupler 16. The springs 82 extend from platform 84 which is mounted upon the shoulders 46 and 48. The platform 84 is vented so there is a full flow of fluid from above it and below it. I prefer to place some dielectric oil (also called transformer oil) in the switch. It will be understood that the switch ring 62 is made of plastic, having low friction properties. Also, it being flat as in the bottom of the coupler 16 and the switch ring 62, forming a first seal to help prevent abrasive material from entering the electric motor.

The switch contact 74 is connected by suitable connection through cable 86 from the switch 40 to first lead in the motor control. The switch contact 76 mounted on the inside of the inner ring 42 is connected by suitable conductor through control cable 86 to holding relay 88. As may be seen in FIG. 4, the contact 74 contacts contact 76 when the switch ring 62 is in the full upper position which indicates that the shafts 14 and 18 have not dropped. The other side of the holding relay 88 is connected to the third line of the electric power cable 28. Therefore, it may be seen when main power switch 90 is closed and if the contacts 74 and 76 are closed, the holding relay 88 will likewise be closed and power will be supplied to the electric motor 22. It will be understood by those skilled in the art that often these pumps have additional controls such as pressure switches, fuses, etc., which are not shown from clarity of illustration. Also, it will be understood that the invention operates equally as well with single phase power as well as three phase electric power as illustrated, and those with ordinary skill in the electric arts will understand how to make the wiring connections.

However, if there is wear upon the thrust bearing 20 and the shaft 18 drops, the contacts 74 and 76 will open and thus opening holding relay 88 and stopping the motor. Also, it may be seen that the dropping and idling down of the shaft 18 will close the contacts 74 and 78 to turn on warning light 92 inasmuch as the light 92 is connected by suitable leads through control cable 86 from the contact 78 to the second line of electric power cable 28. It will be emphasized that the figures of the drawing, such as FIG. 4, are not necessarily to scale and that the exact positions of contacts 74, 76, and 78, may not be exactly according to the proportions shown, but are arranged for clarity of illustration rather than an actual working drawing. However, those with skill in the electrical arts will understand how the contacts should be positioned and constructed.

It will also be understood that in an emergency situation or a situation where the operator feels that the need for pumping the well outweighs possible damage to the pump, the holding relay may be "hot wired" so the pump may continue to be operated. However, the indicator light 92 will always give him a constant reminder that at the earliest possible opportunity the pump and motor should be repaired before expensive damage occurs. Other obvious changes such as test switches and the like, all well understood by those having ordinary skill in the art, could be included.

As an aid to correlating the terms of the claims to the exemplary drawing, the following catalog of elements is provided:

| | |
|---|---|
| 10 pump | 52 bolt holes |
| 12 well | 54 screws |
| 14 pump shaft | 56 studs |
| 16 coupler | 58 diaphragm |
| 18 motor shaft | 60 vents |
| 20 thrust bearing | 62 switch ring |
| 22 electric motor | 64 surface |
| 24 discharge line | 66 inner top ring |
| 26 well cover | 68 outer top ring |
| 28 electric power cable | 70 studs |
| 30 motor control | 72 grooves |
| 32 power source | 74 switch contact |
| 34 water intake | 76 switch contact |
| 36 screen | 78 switch contact |
| 38 housing | 80 O-rings |
| 40 switch | 82 compression springs |
| 42 inner ring | 84 platform |
| 44 outer ring | 86 control cable |
| 46 shoulder | 88 holding relay |
| 48 shoulder | 90 main pwr. switch |
| 50 base plate | 92 light |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a submersible pump unit having
   a. a submersible electric motor enclosed in a motor housing,
   b. a vertically oriented motor shaft extending from said motor,
   c. fluid seals around said motor shaft and all other openings to prevent fluid from entering the motor so the motor may be operated submerged in water,
   d. a source of electrical power,
   e. a normally opened switch connecting said motor to said source of power,
   f. an electric holding coil to hold said switch closed when energized,
   g. a pump attached to said motor,
   h. a pump shaft extending from said pump coaxial with said motor shaft,
   j. a thrust bearing supporting the motor shaft and pump shaft, and
   k. a coupling connecting said pump and motor shaft;
   m. the improvement comprising
   n. a submersible thrust limit switch affixed to said motor housing and bearing against said coupling, forming
   o. detection means for detecting axial movement of said shafts, and
   p. conductor means on said thrust limit switch for connecting it to the electrical power supply,
   q. said switch including
      i. a cavity, and
      ii. a flexible diaphragm between the cavity and the outside of the switch whereby the pressure within the switch is equal to the pressure outside the switch.

2. The invention as defined in claim 1 with an additional limitation of
   r. said switch cavity filled with oil.

3. The invention as defined in claim 1 with an additional limitation of
   r. said thrust limit switch connected to holding coil whereby the normally opened switch is opened responsive to detection of axial movement.

4. In a submersible pump unit having
   a. a submersible electric motor enclosed in a motor housing
   b. a vertically oriented motor shaft extending from said motor,
   c. fluid seals around said motor shaft and all other openings to prevent fluid from entering the motor so the motor may be operated submerged in water,
   d. a source of electrical power,
   e. a normally opened switch connecting said motor to said source of power,
   f. an electric holding coil to hold said switch closed when energized,
   g. a pump attached to said motor,
   h. a pump shaft extending from said pump coaxial with said motor shaft,
   j. a thrust bearing supporting the motor shaft and pump shaft, and
   k. a coupling connecting said pump and motor shaft;
   m. the improvement comprising:
   n. a submersible thrust limit switch affixed to said motor housing and bearing against said coupling, forming
   o. detection means for detecting axial movement of said shafts, and
   p. conductor means on said thrust limit switch for connecting it to the electrical power supply,
   q. an annular housing motor which surrounds said motor shaft,
   s. said switch ring contacting said coupling to form a seal therebetween,
   t. at least one contact between said switch ring and said switch housing to change conditions responsive to axial movement of said coupling.

5. The invention as defined in claim 4 with an additional limitation of
   u. O-rings between said switch ring and said housing to form a fluid seal therebetween.

6. The invention as defined in claim 4 with additional limitations of
   u. said contact on the switch ring and said housing in a normally closed position when said switch ring is in the full raised position, and
   v. an additional contact connected to said housing which contact on the switch ring closes when the switch ring is in the full depressed position.

7. The invention as defined in claim 6 with an additional limitation of
   w. O-rings between said switch ring and said housing to form a fluid seal therebetween.

8. The invention as defined in claim 7 with an additional limitation of
   x. an indicator lamp in series with lower housing contact and a holding relay in series with said upper switch contact.

9. The invention as defined in claim 8 with an additional limitation of
   y. said switch including
      i. a cavity, and
      ii. a flexible diaphragm between the cavity and the outside of the switch whereby the pressure within the switch is equal to the pressure outside the switch.

10. The invention as defined in claim 9 with an additional limitation of
    z. said switch cavity filled with oil.

* * * * *